United States Patent [19]
Lingenfelder et al.

[11] 3,844,638
[45] Oct. 29, 1974

[54] BEAM DOUBLER

[75] Inventors: Paul G. Lingenfelder, Sunnyvale; Jerry D. Fox, San Jose, both of Calif.

[73] Assignee: The United States of America as represented by the Secretary of the Navy, Washington, D.C.

[22] Filed: Oct. 18, 1973

[21] Appl. No.: 407,677

[52] U.S. Cl. ............................... 350/171, 350/173
[51] Int. Cl. ........................................ G02b 27/28
[58] Field of Search ..................... 350/171, 172, 173

[56] References Cited
UNITED STATES PATENTS
3,677,621  7/1972  Smith .................................. 350/173

*Primary Examiner*—James W. Lawrence
*Assistant Examiner*—C. E. Church
*Attorney, Agent, or Firm*—R. S. Sciascia; P. Schneider

[57] ABSTRACT

An optical beam-splitter having two triangular prisms cemented together to form another prism roughly cubical in shape. Looking at the roughly square end formed by two triangular ends of the prisms, the latter are cemented together along their hypotenuse sides, one hypotenuse side having a 50% reflecting–50% transmitting coating. The rear and lower sides of the device have a coating which provides total internal reflectance. The lower side is inclined upwardly from the position in which it would form 90° angles with the front and rear sides, the lower side being longer and the front side shorter than the corresponding sides of the other prism. A light beam is admitted thru the front side of the device and a pair of divergent beams leave the upper side which is at an angle of 90° to the front side.

8 Claims, 1 Drawing Figure

PATENTED OCT 29 1974
3,844,638
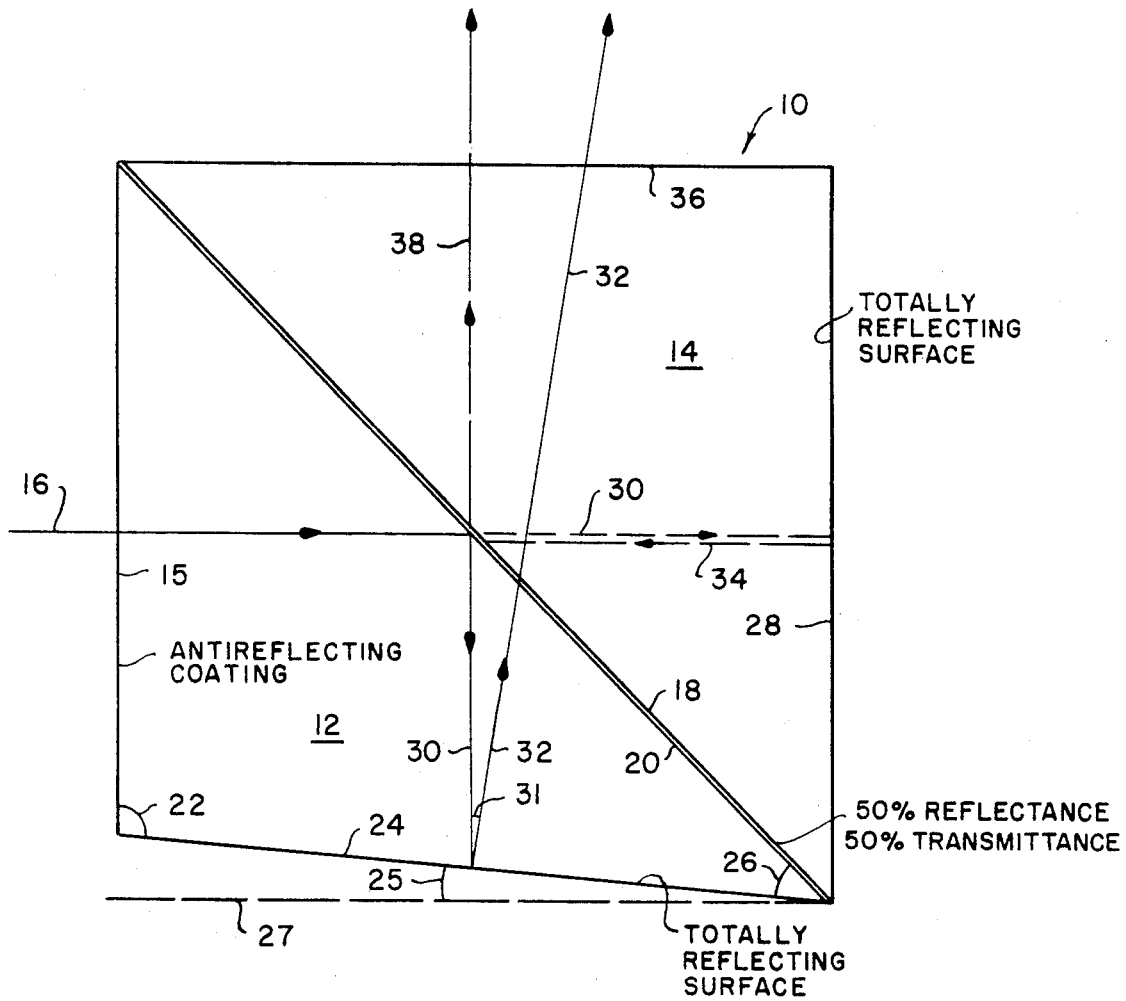

3,844,638

BEAM DOUBLER

BACKGROUND OF THE INVENTION

This invention relates to optics and especially to a beam-doubling, or beam-splitting, prism.

In the field of holography and in optical instruments such as Lloyd's Mirror and various interferometers, it is sometimes desired to produce two light beams with a known and small angle of divergence, which when expanded, will produce the typical two-point interference pattern with a known fringe spacing at a given distance from the point sources.

Holographic and interferometric apparatus have high stability and precision requirements. Lloyd's Mirror provides a small fringe field and problems exist in controlling it.

SUMMARY OF THE INVENTION

The objects and advantages of the present invention are provided by an embodiment comprising a rectangular prism formed by cementing together two triangular prisms along their hypotenuses, one of which has a partially reflecting coating. Two other sides of the rectangular prism have totally reflecting coatings, and the lower side of one of the triangular prisms is tilted upwardly so that the angle between it and the front side is more than 90°. A light beam entering the device is split into two parts one of which emerges at right angles to the incoming beam, and the other of which emerges at a small angle from the other output beam.

An object of the invention is to split an incoming beam of light into two beams.

Another object is to split an incoming beam of light into two beams with a known and small angle of divergence, which beams when expanded, will produce the typical two-point interference pattern with a known fringe spacing at a given distance from the point sources.

Other objects, advantages and novel features of the present invention will become apparent from the following detailed description of the invention when considered in conjunction with the accompanying drawing.

BRIEF DESCRIPTION OF THE DRAWING

The single FIGURE is a schematic illustration in side view of an embodiment of the invention.

DETAILED DESCRIPTION OF THE INVENTION

The FIGURE shows in side view a substantially rectangular prism 10 composed of a pair of triangular prisms, i.e., a front 12 and a rear 14 prism. The terms "front" and "rear" are related to the direction of the incoming light beam 16 which strikes the front prism 12 first.

The prisms are three-sided or triangular prisms, i.e., the two end surfaces, which lie in parallel planes, are triangular. The FIGURE shows one end surface of each of the two prisms.

The sides of the rear prism 14 form a right triangle having a rear side 28 which has a coating providing total internal reflectance, a translucent upper side 36 and a hypotenuse 18. The upper and rear sides form a right angle.

The sides of the front prism 12 also form a triangle. However, the lower side 24, which has a coating which provides total internal reflectance, is upwardly inclined from the position which it would have to have to form a right angle with the front side 15. Thus, angle 22 is greater than 90° by an amount, $\theta°$, $\theta$ being the angle of inclination 25. However, since $\theta$ is usually a small angle, the third side 20 of the front-prism triangle will be called a hypotenuse.

The two prisms form roughly a square when the two hypotenuses are cemented together, one hypotenuse surface first being coated with a 50% reflecting– 50% transmitting coating. The two upper angles formed by the front side 15 and the rear side 28 with the upper side 36 are right angles.

The lower side 24 of the front prism 12 is totally reflecting on the internal side. The rear surface 28 of the rear prism 14 is also totally reflecting internally. These two totally reflecting surfaces have an angle of $(90-\theta)°$ between them.

The incoming beam 16 hits the junction between the hypotenuse 18 and hypotenuse 20; half of the beam being reflected downward 30, and half being transmitted 30 to the rear side 28. The reflected half beam 30 is totally reflected 32 from the inclined bottom side 24 of the front prims 12 and passes thru the hypotenuse surfaces up thru the top surface 36 of the rear prism 14 and out of the beam splitter 10. The transmitted half beam 30 is totally internally reflected 34 by the rear side 28 of the rear prism 14, hits the coating on the hypotenuse surfaces and is reflected 38 up and out of the beam splitter 10. The angle between the two beams 38 and 32 which emerge from the top surface 36 of the beam splitter 10 is the angle of divergence 31 and is equal to the inclination angle $\theta$.

The front side 15 of the splitter 10 which the incoming beam strikes first is at right angles to the upper side 36 from which the split beams 38 and 32 emerge. Since the splitter is often used with a condensing lens which focuses the two beams on the same spot to form an interference pattern, the angle of divergence should be small, probably no more than 5°.

The distance between the two end surfaces of the prisms can be small or large, as desired. It is usually larger than the same dimension of the light beam and preferably is equal to the length of the upper side so that the beam-splitter is roughly cubical in shape.

It should be noted that the lower side 24 could be inclined downwardly, in which case it would be below line 27 which is the position it would have if angle 22 were a 90° angle. Beam 32 would then be to the left of beam 38.

Obviously, many modifications and variations of the present invention are possible in light of the above teachings. It is therefore to be understood that, within the scope of the appended claims, the invention may be practiced otherwise than as specifically described.

What is claimed is:

1. A beam-splitting device for splitting an incoming beam of light into two outgoing light beams comprising:

a front and a rear prism, each having their parallel-plane end faces in the form of a triangle,
the triangle of the end faces of the rear prism being a right triangle and the triangle of the front prism being roughly a right triangle except that one of the two sides thereof which would form the right angle is inclined,
said two prisms being fitted together along their hypotenuses so that the rear prism provides a rear and an upper side for the device and the front prism provies a front and a lower side, the lower side being the inclined side, one of the hypotenuses being coated with a partially reflecting-partially transmitting coating, the incoming light beam entering the front side and striking the reflecting-transmitting coating, part of the beam being reflected downward to the inclined side and being reflected upward thru the upper side of the device, and part of the incoming beam being transmitted to the rear side, reflected back to the reflecting-transmitting coating and reflected up thru the upper side of the device, so that two separated light beams emerge from said upper side, the angle of divergence of said light beams being the same as the angle of inclination of said lower side.

2. The device of claim 1, wherein the angle of inclination is small.

3. The device of claim 1, wherein the upper and rear sides are equal.

4. The device of claim 1, wherein said beam splitting device is roughly cubical.

5. The device of claim 1, wherein the angles between the front and the upper sides and between the upper and the rear sides are right angles.

6. The device of claim 1, wherein the angle between the rear and lower sides is less than 90° by the amount of the angle of inclination and the angle between the front and lower sides is greater than 90° by the amount of the angle of inclination.

7. The device of claim 1, wherein said lower side is inclined upwardly.

8. The device of claim 1, wherein said coating on said hypotenuse is a 50% reflecting– 50% transmitting coating.

* * * * *